United States Patent
Van Dun et al.

(10) Patent No.: US 9,656,480 B2
(45) Date of Patent: May 23, 2017

(54) PRINTING SYSTEM FOR PRINTING ON A PLURALITY OF PRINT MEDIA STORED IN A PRINT MEDIA CATALOG

(71) Applicant: OCÉ-TECHNOLOGIES B.V., Venlo (NL)

(72) Inventors: Josephus A.M. Van Dun, Venlo (NL); Paul Dekkers, Venlo (NL); Amar Kalloe, Venlo (NL)

(73) Assignee: OCÉ-TECHNOLOGIES B.V., Venlo (NL)

(*) Notice: Subject to any disclaimer, the term of this patent is extended or adjusted under 35 U.S.C. 154(b) by 0 days.

(21) Appl. No.: 15/205,262

(22) Filed: Jul. 8, 2016

(65) Prior Publication Data

US 2017/0008310 A1 Jan. 12, 2017

(30) Foreign Application Priority Data

Jul. 9, 2015 (EP) .................................... 15176148

(51) Int. Cl.
*B41J 11/00* (2006.01)
*G06K 15/02* (2006.01)
(Continued)

(52) U.S. Cl.
CPC ....... *B41J 11/0005* (2013.01); *G06K 15/1809* (2013.01); *G06K 15/4065* (2013.01); *B41J 2/04501* (2013.01); *B41J 2/04506* (2013.01)

(58) Field of Classification Search
CPC B41J 11/0005; B41J 2/04501; B41J 2/04506; G06K 15/1809; G06K 15/4065
(Continued)

(56) References Cited

U.S. PATENT DOCUMENTS

2003/0046131 A1 3/2003 Holzwarth
2005/0031392 A1* 2/2005 Yamamoto ............. B41J 11/009
400/62

(Continued)

FOREIGN PATENT DOCUMENTS

EP 2 523 447 A1 11/2012
EP 2 645 228 A2 10/2013

*Primary Examiner* — Huan Tran
*Assistant Examiner* — Alexander D Shenderov
(74) *Attorney, Agent, or Firm* — Birch, Stewart, Kolasch & Birch, LLP

(57) ABSTRACT

A printing system includes a storage unit, a print unit and a control unit. The storage unit includes a print media catalog including a list of print media, each print medium in the list having a plurality of media attribute values characterizing the print medium, and each print medium categorized in at least one group based on at least one media attribute value. The print unit includes a print head for ejecting marking material on a print medium of the list. The control unit is configured to control the printing on a print medium of the list according to a plurality of optimization parameters, an optimization parameter being related to the at least one media attribute value used for categorization in a group of the at least one group. Upon receipt of a value of a particular optimization parameter for a print medium categorized in a particular group of the at least one group, the received value is automatically propagated to other print media categorized in the same particular group. A method is suitable for application in the printing system.

8 Claims, 9 Drawing Sheets

| Media Attribute / Optimization | Size 310 | Color 312 | Thickness | Weight | Transparency | Gloss | Pliability | Ink Permeability |
|---|---|---|---|---|---|---|---|---|
| Registration | X | | | | | | | |
| Curl Correction | X | | X | X | | | X | X |
| Transfer Voltage | | | | | X | X | | |
| B&W Contrast | | X | | | | | | |

300

(51) Int. Cl.
*G06K 15/00* (2006.01)
*B41J 2/045* (2006.01)

(58) Field of Classification Search
USPC .......................................................... 347/16
See application file for complete search history.

(56) References Cited

U.S. PATENT DOCUMENTS

| | | |
|---|---|---|
| 2007/0008594 A1 | 1/2007 | MacDonald et al. |
| 2009/0213414 A1 | 8/2009 | Braverman et al. |
| 2014/0268234 A1* | 9/2014 | Iida .................... G06K 15/4065 358/1.15 |
| 2014/0293300 A1 | 10/2014 | Teraue |

* cited by examiner

| Media Attribute / Optimization | Size 310 | Color 312 | Thickness | Weight | Transparency | Gloss | Pliability | Ink Permeability |
|---|---|---|---|---|---|---|---|---|
| Registration | X | | | | | | | |
| Curl Correction | X | | X | X | | | X | X |
| Transfer Voltage | | | | | X | X | | |
| B&W Contrast | | X | | | | | | |

PRINTING SYSTEM FOR PRINTING ON A PLURALITY OF PRINT MEDIA STORED IN A PRINT MEDIA CATALOG

CROSS-REFERENCE TO RELATED APPLICATIONS

This application claims priority under 35 U.S.C. §119(a) to Application No. 15176148.3 filed in Europe on Jul. 9, 2015, the entire contents of which is hereby incorporated by reference into the present application.

BACKGROUND OF THE PRESENT INVENTION

1. Field of the Invention

The present invention relates to a printing system comprising a storage unit, a print unit and a control unit, the storage unit comprising a print media catalog comprising a list of print media, each print medium in the list having a plurality of media attribute values characterizing the print medium, and each print medium categorized in at least one group based on at least one media attribute value, the print unit comprising a print head for ejecting marking material on a print medium of the list, and the control unit configured to control the printing on a print medium of the list according to a plurality of optimization parameters, an optimization parameter being related to the at least one media attribute value used for categorization in a group of the at least one group.

By the term printing system, a system is meant that has a print function, for example a printer, a copier, a multifunctional, a roll-to-roll printer, a roll-to-sheet printer, a cut sheet printer, a flatbed printer, and a relief printer. By the term media attribute is meant an attribute of a print medium, like size, color, thickness, weight, gloss, transparency, pliability, ink permeability, toner adhesiveness, etc.

The present invention further relates to a method which is applicable in a printing system according to the present invention.

2. Description of Background Art

Currently, possible optimizations, for example curl correction of a print medium or registration of a print medium, are typically stored in the storage unit with the print medium itself in the list of print media in the print media catalog. This means that all these optimizations need to be made for all print media in the print media catalog, which amounts to much work to obtain and keep the printing system in the best state possible.

SUMMARY OF THE PRESENT INVENTION

An object of the present invention is to provide a printing system in which the maintenance of the optimization parameters is less cumbersome.

The object is achieved in a printing system of the above-mentioned kind, wherein for a print medium categorized in a particular group based on a first media attribute value upon receipt of a value of a particular optimization parameter related to the first media attribute value, the received value is automatically propagated to other print media categorized in the same particular group.

The particular optimization parameter is related to the at least one media attribute value upon which the particular group is based. The inventor has recognized that sharing of optimization parameters between print media is possible and depends on a value of at least one media attribute that the print media categorized in a group have in common.

An optimization parameter of the plurality of optimization parameters is used for optimizing the printing on the particular print medium.

Different optimizations require a different sharing matrix among print media in the list in the print media catalog, which print media are gathered in at least one group.

According to an embodiment, the printing system comprises a user interface configured to receive a selection of a print medium from the list for a group of the at least one group when changing said group. The selection may be entered by an operator of the printing system by means of the user interface.

According to an embodiment, the control unit is configured to predetermine a group of the at least one group at set up of the printing system and to enable a creation of a group of the at least one group by the operator by means of the user interface. Predetermining groups may be, for example, in the set-up of the printing system due to a combination of the technical characteristics of the printing system and suitable print media in the print media catalog.

According to an embodiment, the particular optimization parameter is a parameter for a media registration suitable for media having a particular size. Optimization parameters for a registration of print media have a same value for print media of a same approximate size, e.g. all A4-like print media may share a registration setting.

According to an embodiment, the particular optimization parameter is a parameter for a curl correction suitable for media having a particular size-weight combination. A value of an optimization parameter for a curl correction is shared with print media having a same size/weight combination, e.g. all Heavy (120 gr·m2) A4's can share a curl correction.

According to an embodiment, the particular optimization parameter is a parameter for the application of a transfer voltage of a particular value suitable for print media having a particular surface type. Print media having a particular surface type may be, for example, plain paper, coated media, transparent media, etc.

The present invention also relates to a method for sharing values of optimization parameters for control of printing in a printing system, the printing system comprising a storage unit, a print unit and a control unit, the storage unit comprising a print media catalog comprising a list of print media, each print medium in the list having a plurality of media attribute values characterizing the print medium, and each print medium categorized in at least one group based on at least one media attribute value, the print unit comprising a print head for ejecting marking material on a print medium of the list, and the control unit configured to control the printing on a print medium of the list according to a plurality of optimization parameters, an optimization parameter being related to the at least one media attribute value used for categorization in a group of the at least one group, wherein the method comprises the steps of receiving a value of a particular optimization parameter for a print medium categorized in a particular group of the at least one group, and automatically propagating the received value to other print media categorized in the same particular group.

According to an embodiment, the method comprises the steps of selecting a print medium from the media catalog and adding the selected print medium to a group of the at least one group when creating or changing the group.

According to an embodiment, the method comprises the step of creating or changing the group and simultaneously showing applicable optimizations for the group, the applicable optimizations being related to the optimization parameters for the printing system. This is advantageous, since only applicable optimizations are shown, which helps the operator to create dedicated and useful groups of media attributes.

According to an embodiment, the method is executed on a processor comprised in the printing system.

The present invention also relates to a computer-program product embodied on a non-transitory computer readable medium and configured to execute the method according to the present invention when executed on a processor.

The present invention also relates to a non-transitory data carrier having stored thereon the computer-program product according to the present invention.

Further scope of applicability of the present invention will become apparent from the detailed description given hereinafter. However, it should be understood that the detailed description and specific examples, while indicating preferred embodiments of the present invention, are given by way of illustration only, since various changes and modifications within the spirit and scope of the present invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 3 illustrates a sharing table of media attributes and optimizations according to the present invention;

DETAILED DESCRIPTION OF THE PREFERRED EMBODIMEMTS

Figure 1:
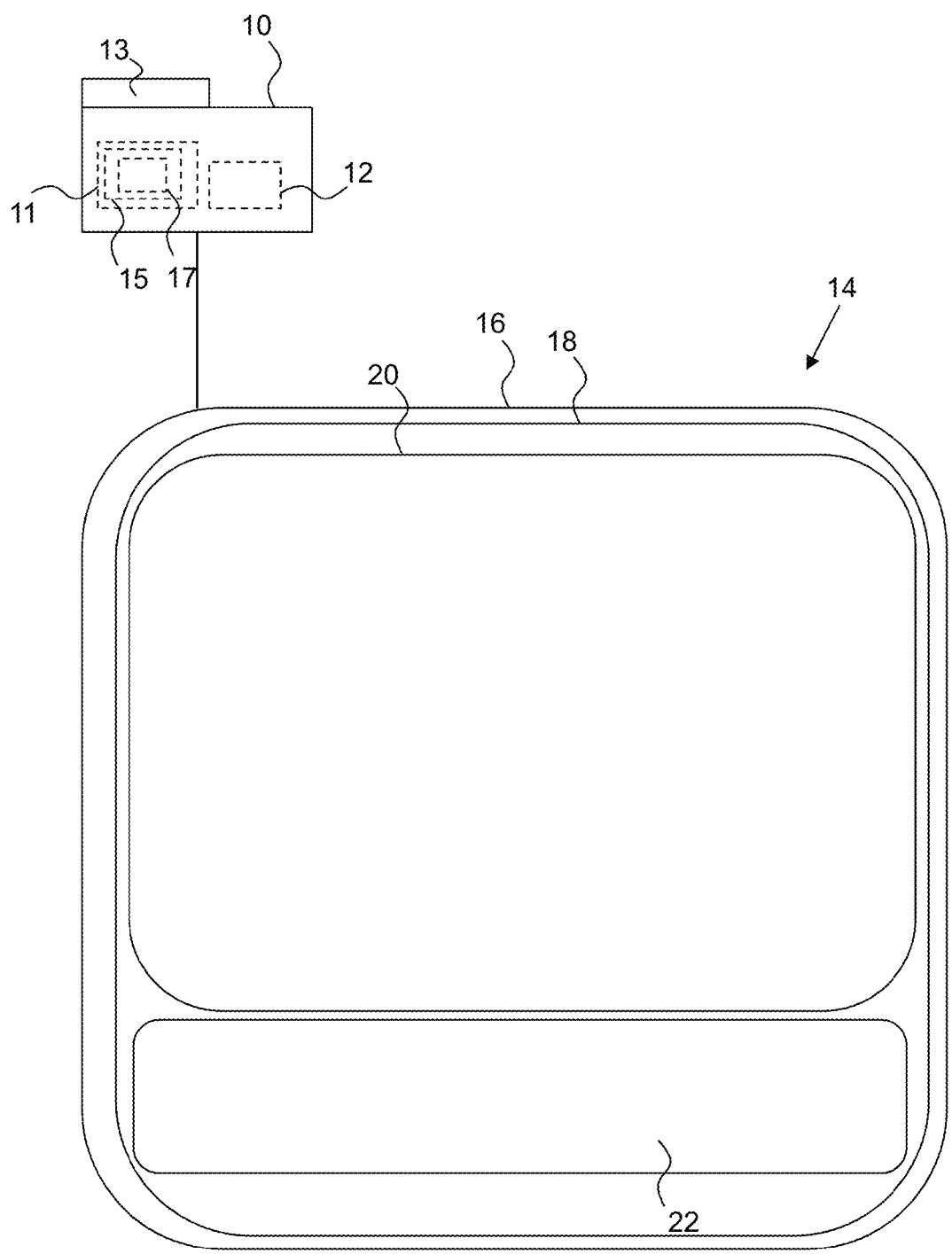
FIG. 1 is a block diagram of a printing system according to the present invention.

The present invention will now be described with reference to the accompanying drawings, wherein the same reference numerals have been used to identify the same or similar elements throughout the several views.

As an illustrative example, FIG. 1 shows schematically a printing system 10 having a storage unit 11, a control unit 12 and a print unit 13. The storage unit 11 comprises a print media catalog 15 comprising a list 17 of print media. Each print medium mentioned in the list 17 has a plurality of media attribute values characterizing the print medium. Each print medium categorized in at least one group is based on at least one media attribute value. The print unit 13 comprises a print head or print assembly (not shown) for ejecting marking material like ink on or appending marking material like toner particles to a print medium mentioned in the list 17.

The control unit 12 is configured to control the printing on a print medium mentioned in the list 17 according to a plurality of optimization parameters. An optimization parameter is related to the at least one media attribute value used for categorization in a group of the at least one group. The control unit 12 is connected to a user interface 14.

The user interface 14 has a control panel 16 with a display 18, e.g. in the form of a touch-sensitive screen which, in this example, shows a window 20 and a command window 22. The command window 22 may be used for entering operating commands such as "cancel," "back," "optimize," and "print," as is generally known in the art and will not be described in detail here. The window 20 is shown in detail in FIG. 2.

A user who is going to print an image by means of the printing system 10 may want to enter values for optimization parameters, which are used when printing on a print medium mentioned in the list 17. The user may know which print medium is going to be used for printing. Therefore the user navigates via the user interface 14 to the window 200 shown in FIG. 2. The print medium X which is intended to be used is a Heavy (120 gr/m2) coated A4 print medium.

Figure 2:
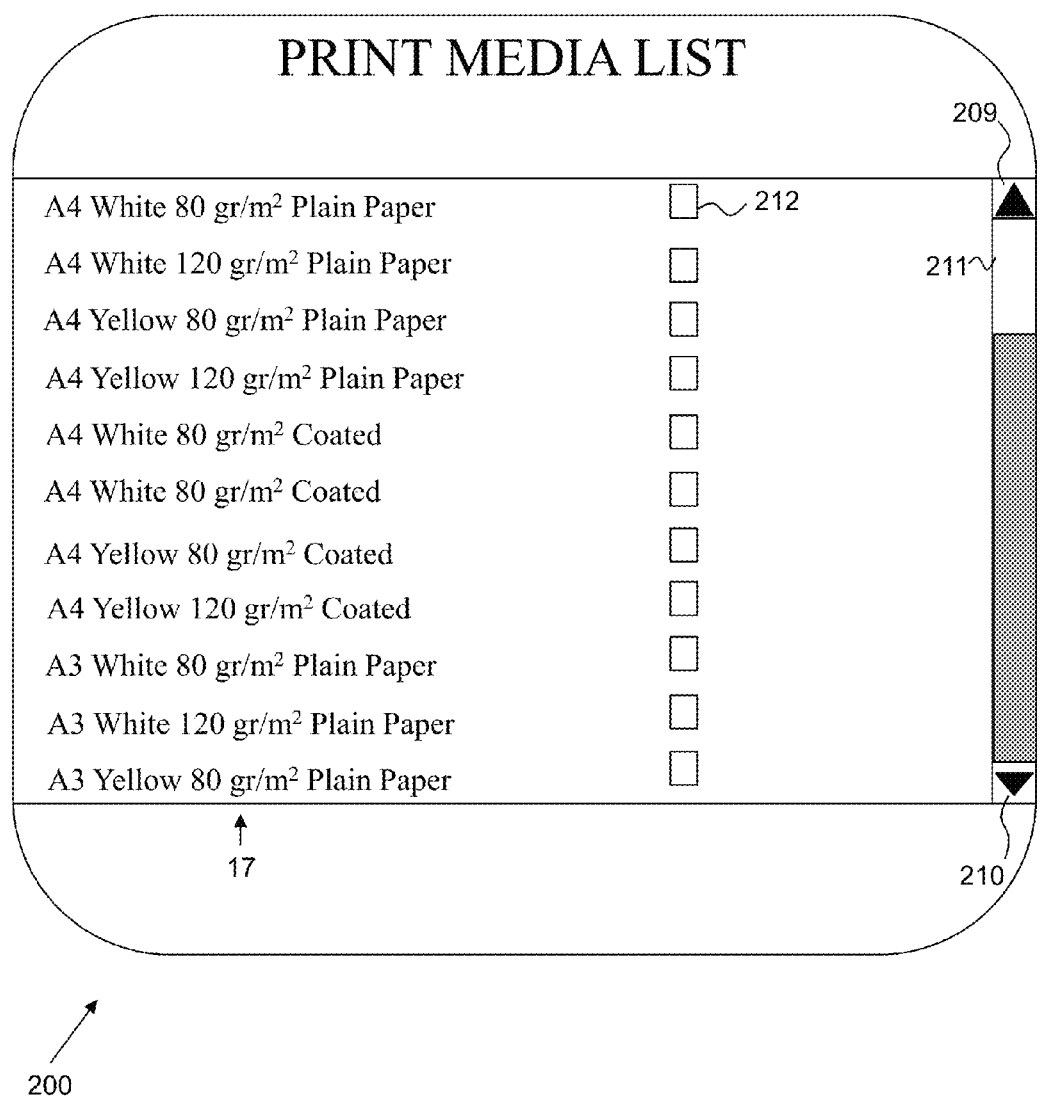
FIG. 2 illustrates a display window of a user interface of the printing system showing the list of media in the media catalog according to the present invention.

FIG. 2 illustrates a display window 200 of a user interface of the printing system showing the list 17 of media in the media catalog according to the present invention. Each media in the list 17 is selectable for use in a print job by means of the check boxes 212. The list 17 is scrollable by means of user operable digital objects 209, 210, 211.

FIG. 3 illustrates a sharing table 300 of media attributes and optimizations according to the present invention. In one direction of the table 300, the media attributes are listed. In another direction of the table 300, the optimizations are listed. At each entry of a specific media attribute and a specific optimization, a checkbox 310, 312 is provided. A check box 310 is checked when the optimization in the row of the checkbox is related to the media attribute in the column of the checkbox. A checkbox 312 is not checked when the optimization in the row of the checkbox is not related to the media attribute in the column of the checkbox. The sharing table may be used internally by the control unit of the printing system when defining groups of media according to the present invention and applying suitable and applicable optimizations for such a group.

Figure 4:
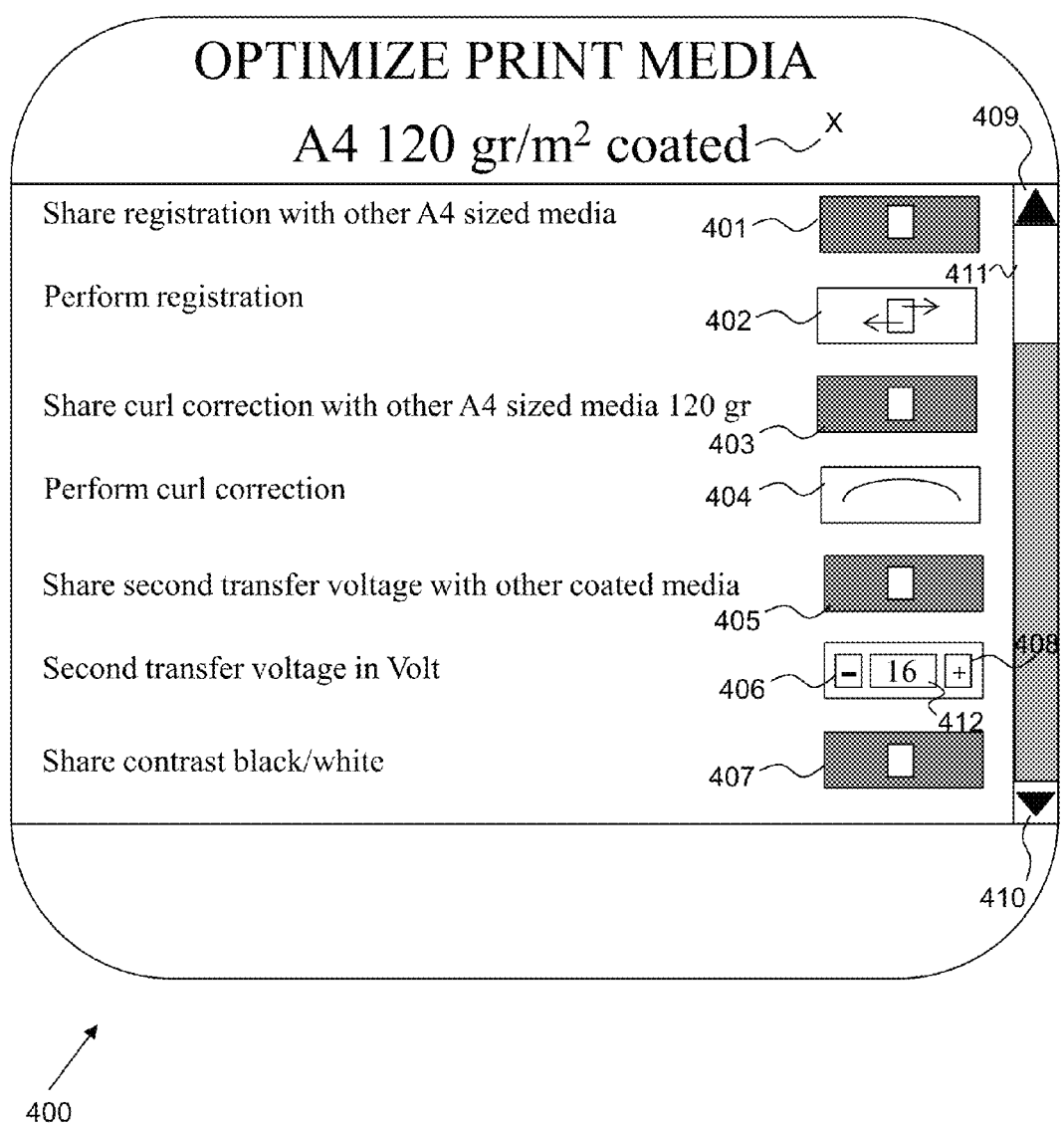
FIG. 4 illustrates a first display window of a user interface of the printing system showing optimization options for optimizing the use of print media in the printing system according to the present invention.

FIG. 4 illustrates a window 400 for optimizing print media. The window 400 shows user operable digital objects 401-411 for activating and navigating through appropriate optimization options.

The user operable digital objects 401, 403, 405, 407 are check boxes for confirming a sharing of a registration setting with other A4 sized print media, for sharing a curl correction with other heavy A4 sized print media, for sharing a secondary transfer voltage with other coated print media and for sharing a black and white contrast setting, respectively.

The user operable digital objects 402, 404, 406, 408 are push buttons for performing optimization actions related to the check boxes 401, 403, 405, respectively. By means of the user operable digital objects 406, 412, 408, a value for the secondary transfer voltage may be entered in order to share the value with other coated print media. In this example, the operator is able to indicate whether or not he would like to share certain optimizations with certain groups.

In this example, the grouping mechanism is predetermined, but the operator still has freedom to have a specific optimization for only the print medium X, by means of unchecking at least one of the check boxes 401, 403, 405, 407. It is noted that the number of user operable digital objects shown in the window 400 is limited, but scrolling to further user operable digital objects and thus to other optimization options is enabled by means of the user operable digital objects 409, 410, 411 forming a scroll bar.

In the example here-above, a group of print media having a size equal to A4 is defined, a group of print media having a size equal to A4 and a weight of e.g. 120 gr/m2 (Heavy) is defined, and a group of coated print media is defined.

If the operator wants to perform a registration procedure with the print medium X and activates the push button 402, all other A4-sized print media in the list of the print media catalog which have "sharing on"—by means of the checked check box 401 for the other print media—will have their registration parameters updated with the values resulting from the executed registration procedure on the print medium X. A registration action may be used to center an image on a sheet of a print medium and to align front and back images on both sides of the sheet of the print medium.

A same procedure is valid for performing a curl correction using the push button 404 and check box 403. Curled media may be corrected for by means of a curl correction module in the printing system, which is configured by means of a curl correction parameter. The curl correction parameter value is settable per print medium.

A same procedure is valid for performing a second transfer voltage using the buttons 406, 412, 408 and check box 405. The secondary transfer voltage is a voltage that may be used in transferring toner from a belt to a media. The secondary transfer voltage can be adjusted per media for optimal print quality for, e.g. rough or embossed paper. The secondary transfer voltage may depend on the kind of media. A decrease of the secondary transfer voltage may be recommended for light (thin) paper, when tiny white spots appear on low density areas, although the density of high density areas is normal, when white spots appear on the high density areas, or when the paper surface is rough, such as for embossed paper, and white spots appear on the concave side of the paper. An increase of the secondary transfer voltage may be recommended for heavy (thick) paper, when a density level in both high and low density areas is low, when uneven gloss occurs in the high density images, or when an outline of high density images blurs.

In the embodiment according to FIG. 4, the defined groups are predetermined by the control unit of the printing system.

Figure 5:
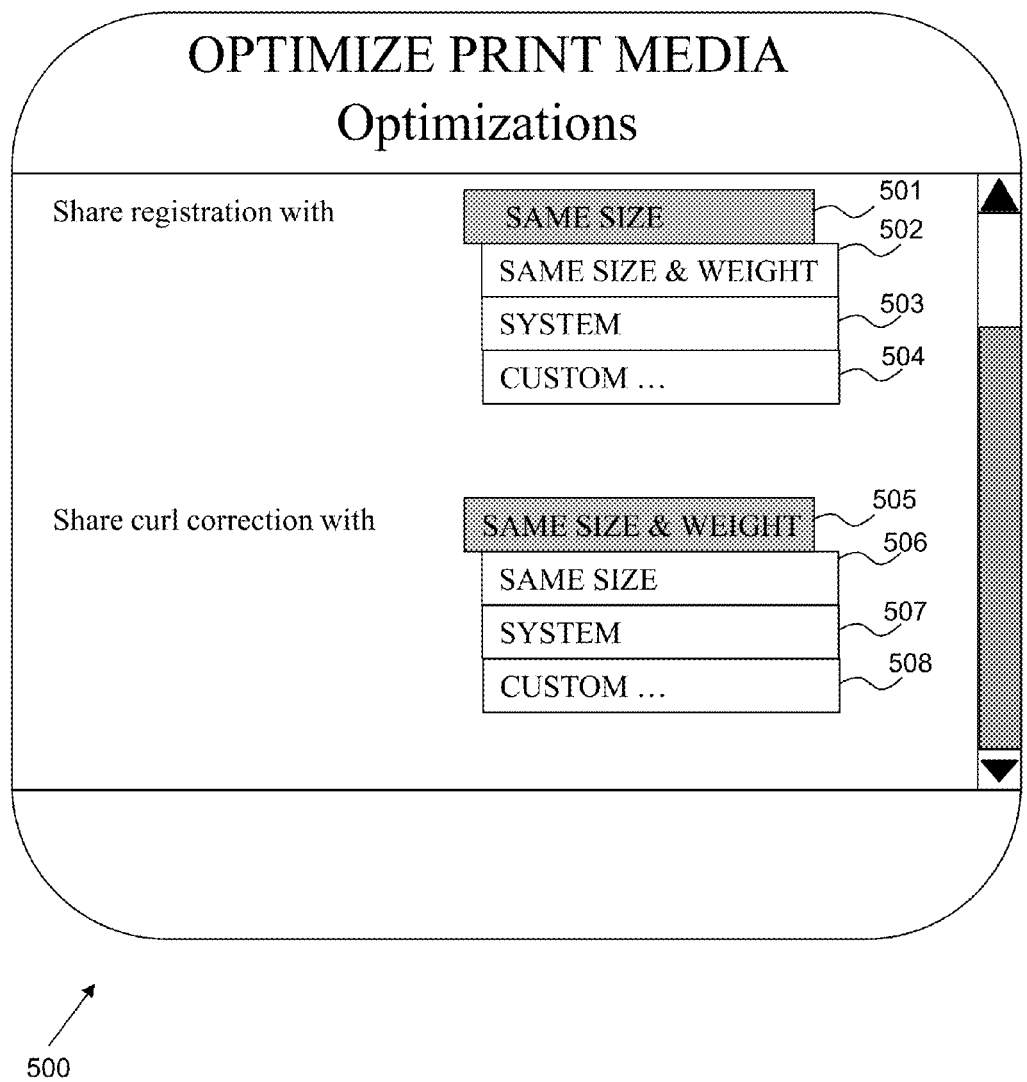
FIG. 5 illustrates a second display window of a user interface of the printing system showing options for creating the groups of print media according to the present invention.

In FIG. 5, another embodiment of a window 500 is shown with a possibility to make the groups settable by the user. A plurality of user operable digital objects 501-508 is shown. Each of the user operable digital objects 501-508 may be activated to form a group of print media for a number of optimizations like registration, curl correction, second transfer voltage, etc. A user operable digital object 501-508 determines with which defined groups the corresponding optimization parameter will be shared.

A determined registration parameter value by means of an executed registration on one member—print medium—of the group will be shared with all members of the group of print media having the same size, if push button 501 is activated, or with all members of the group of print media having the same size and the same weight, if push button 502 is activated.

A determined curl correction parameter value by means of an executed curl correction on one member—print medium—of the group will be shared with all members of the group of print media having the same size and weight, if push button 505 is activated, or with all members of the group of print media having the same size, if push button 506 is activated.

If push button 503 is activated, the printing system, more specifically the control unit, will share the determined value of the registration parameter with all print media in the media catalog. For example, if the printing system is only used for A4 media, the registration parameter value may be shared with all print media.

If push button 507 is activated, the printing system, more specifically the control unit, will share the determined value of the curl correction parameter with all print media in the media catalog. For example, if the printing system is only used for A4 80 gr/m2 media, the curl correction parameter value may be shared with all print media.

In a further embodiment, a smart default group or recommended group for a particular optimization is shown for a specific media attribute or a specific group of media attributes. The default or recommended group may be shown first in the list or in another color. In this example, the default group for sharing a registration will be a group having a same size indicated by means of the user operable digital object 501 having another color than the user operable digital objects 502-504, and the default group for sharing a curl correction will be a group having a same size and weight indicated by means of the user operable digital object 505 having another color than the user operable digital objects 506-508.

Figure 6:
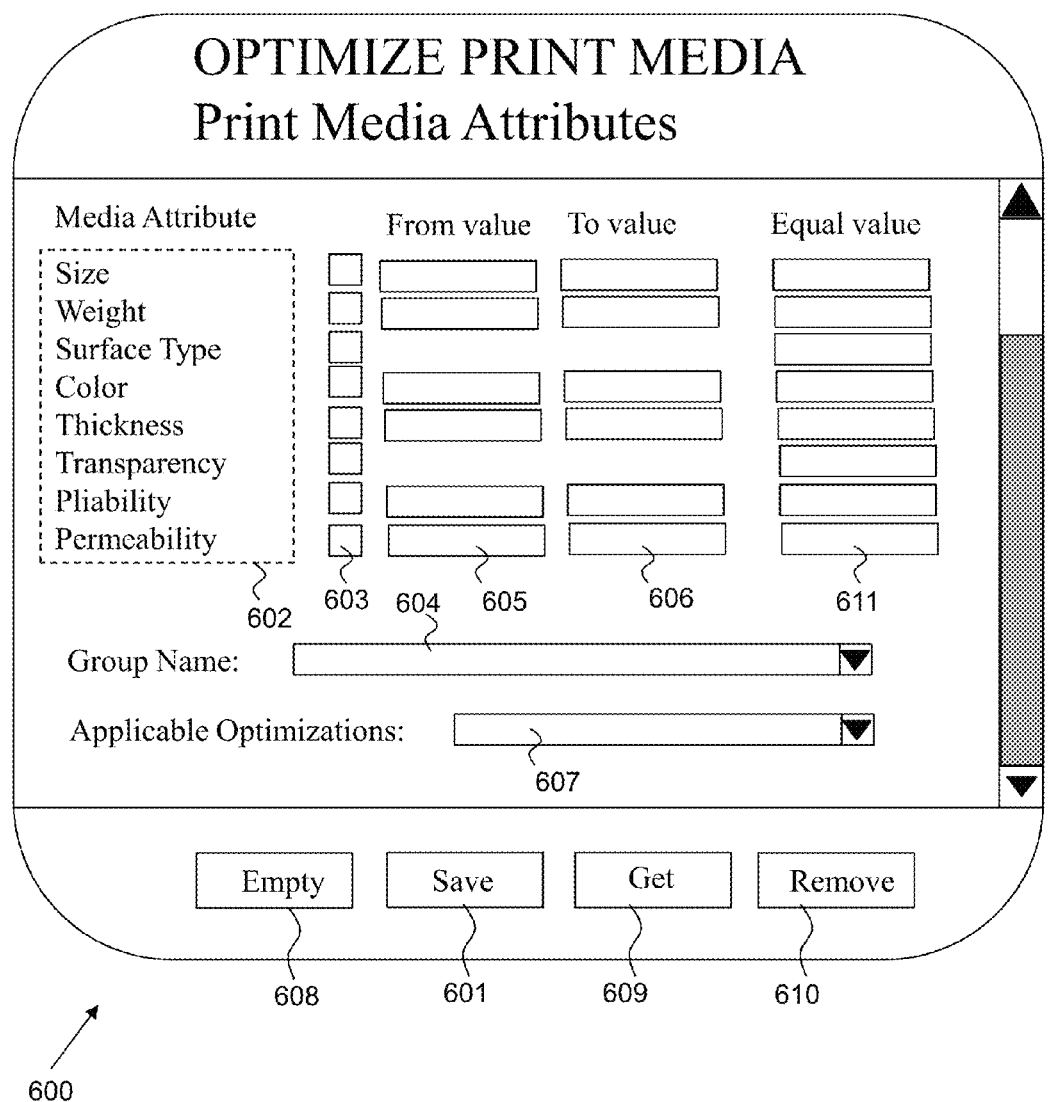
FIG. 6 illustrates a third display window of a user interface of the printing system showing options for creating the groups of print media according to the present invention.

The user is even allowed to define a custom group for optimizing a registration parameter by means of user operable digital object 504. When clicking on the button 504 titled "Custom . . . ," a further window 600 opens, as shown as in FIG. 6. The further window 600 shows a list 602 of media attributes related to print media in the print media catalog. One or more media attributes in the list 602 can be selected by check boxes 603 in order to form a group of print media according to the present invention. If applicable, a value range having a "From value" 605 and a "To value" 606 may be entered for a media attribute.

If applicable, a specific value 612 may be entered for a media attribute. A name for the group may be entered in or selected from a combo or drop down box 604.

A command button 608 may be activated to empty the checkboxes and to empty entered value ranges. A command button 601 may be used to save a created group with a group name entered in combo box 604. A command button 609 may be used to get an already saved group named in combo box 604. A command button 61Q may be used to remove an already saved group named in combo box 604.

In another embodiment, the user is able to drill down on a media attribute in the list 602 for selecting a value or a value range for the media attribute. The selected value or value range is used to limit the number of print media belonging to the respective group.

In a dynamically changing combo box 607, a list of at least one optimization is shown, which is applicable to the current group present in window 600. The list is automatically updated while the group is created, while an already saved group is changed with respect to media attribute checks in check boxes 603 and/or, with respect to entered value ranges 605, 606. One or more optimizations may be selected in the combo box 607 and saved together with the created group.

Other kinds of user operable digital objects may be envisioned on the respective user interface windows shown in FIGS. 2, 4, 5 and 6.

Figure 7:
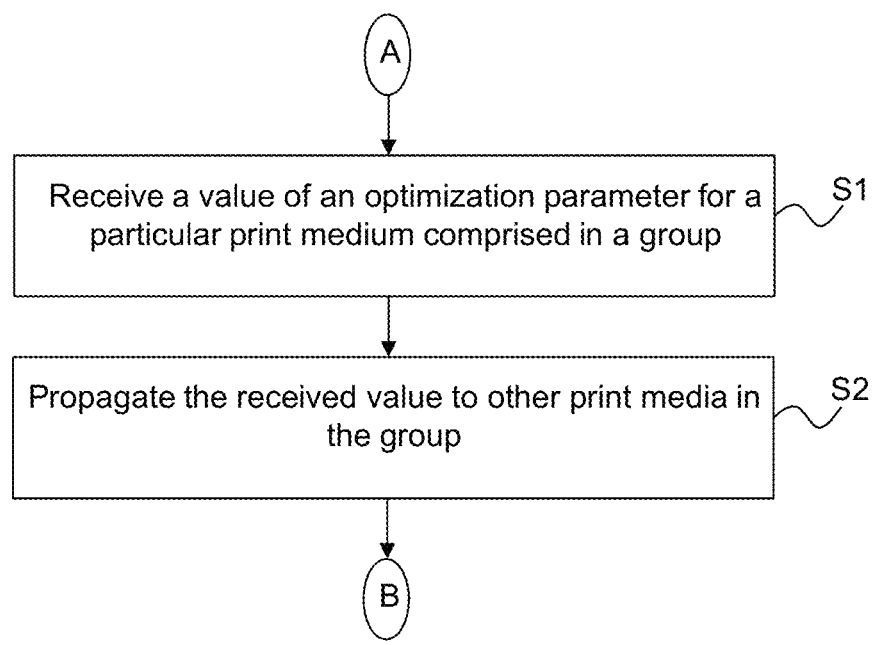
FIG. 7 is a first flow diagram of an embodiment of the method according to the present invention.

A first embodiment of the method for sharing optimization parameters among print media is explained in FIG. 7. A starting point A in FIG. 7 leads to a first step SI.

In the first step 51, a value of a particular optimization parameter for a print medium categorized in a particular group of the at least one group according to the present invention is received. The receipt may be via a user interface of the printing system. The value is processed in the control unit of the printing system and stored in the storing unit of the printing system. The user interface may be implemented locally or remotely, wired or wirelessly.

In a second step S2, the received value is automatically propagated to other print media categorized in the same particular group. The control unit controls the propagation of the value. The propagation comprises a copy of the value to a value for an optimization parameter for another print medium and the copy may be stored in the storing unit of the printing system. The values of the optimization parameters are usually stored at a storage location in the media catalog for the appropriate print media.

The method ends in the end point B.

Figure 8:
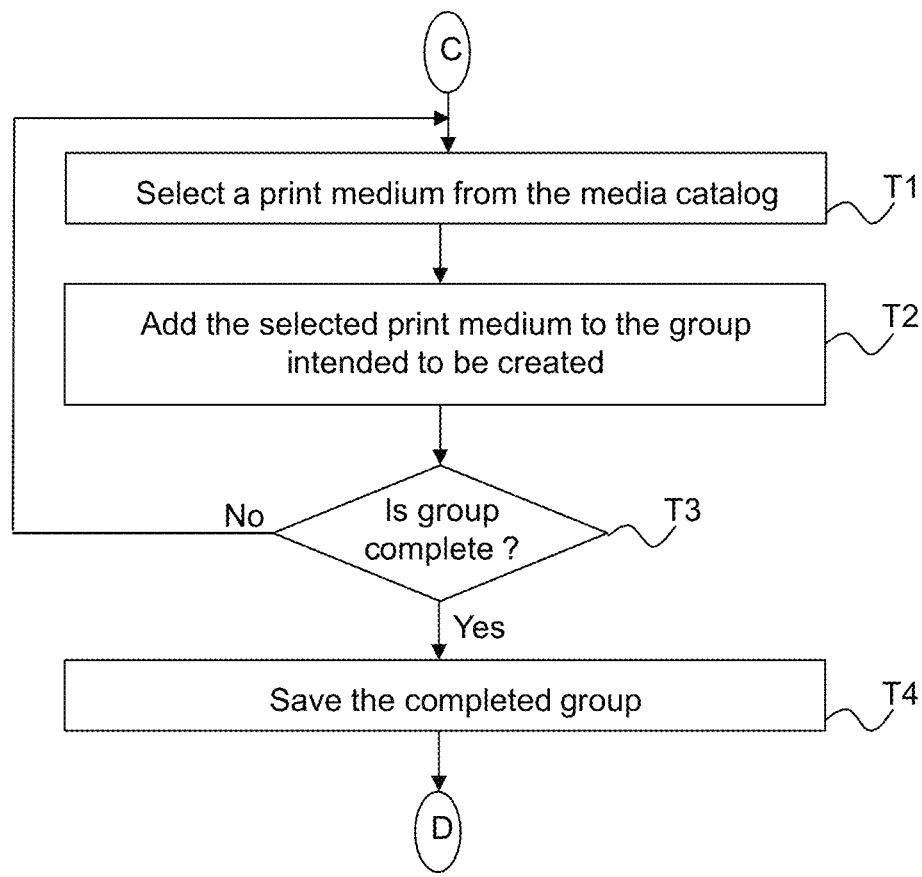
FIG. 8 is a second flow diagram of an embodiment of the method according to the present invention.

An embodiment of the method for creating a group according to the present invention is explained in FIG. 8. A starting point C in FIG. 8 leads to a first step T1.

In the first step T1, a print medium is selected from the media catalog.

In a second step T2, the selected print medium is added to a group to be created.

In a third step T3, it is checked if the group is complete. If so, the method proceeds to a fourth step T4. If not, the method returns to the first step T1.

In the fourth step T4 the completed group is saved in the storage unit of the printing system for further use when printing on a print medium comprised in the group.

The method ends in an end point D.

Figure 9:
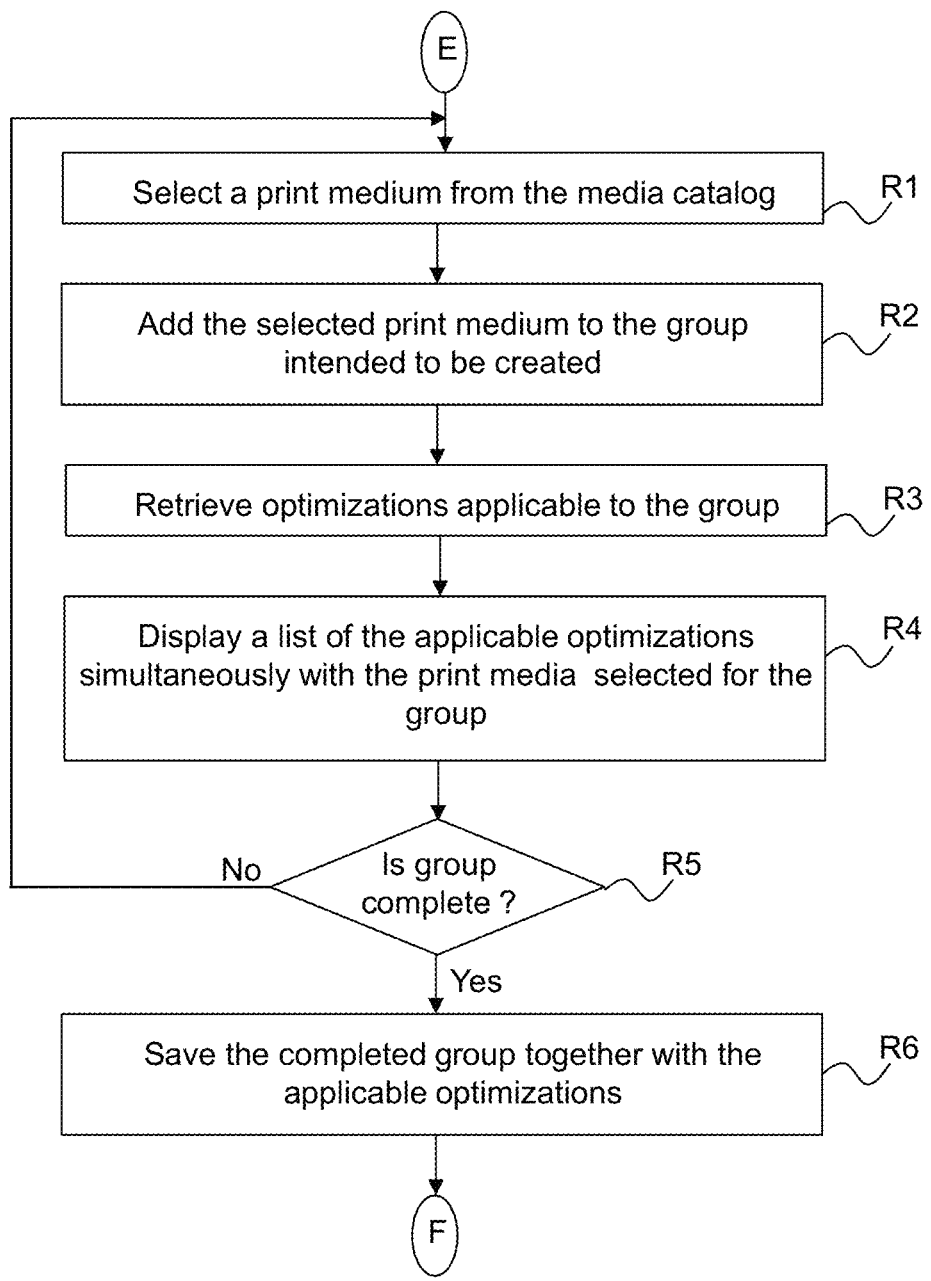
FIG. 9 is a third flow diagram of an embodiment of the method according to the present invention.

A further embodiment of the method for creating a group according to the present invention is explained in FIG. 9. A starting point E in FIG. 9 leads to a first step R1.

In the first step R1, a print medium is selected from the media catalog.

In a second step R2, the selected print medium is added to a group to be created.

In a third step R3, applicable optimizations are retrieved from the storage unit. An applicable optimization is an optimization on behalf of optimization parameters, which are related, are associated and/or affect the printing on the print media selected in the group intended to be created.

In a fourth step R4, a list of the applicable optimizations is displayed simultaneously with the print media, which are already selected for the group. This is advantageous, since only applicable optimizations are shown, which helps the operator to create a dedicated and useful group of media attributes. An example of such a list is the list 407 shown in FIG. 4. When a print medium is added to the group in the second step R2, the applicable optimizations for the extended group is retrieved in step R3, and the list of applicable optimizations shown in the fourth step R4 is updated. In this way, the user has an immediate feedback of the addition of a print medium to the group intended to be created with respect to the applicable optimizations and involved optimization parameters of the printing system.

The list of the applicable optimizations may be user operable, meaning that an applicable optimization in the list may be deselected in an optional step before proceeding to a fifth step R5.

In the fifth step R5, it is checked if the group is complete. If so, the method proceeds to a sixth step R6. If not, the method returns to the first step R1.

In the sixth step R6, the completed group is saved in the storage unit of the printing system for further use when printing on a print medium comprised in the group. Besides storing the group in storage, also the applicable optimizations—whether or not after de-selection of applicable optimizations in the optional step mentioned here-above—are stored with the group in storage in the storage unit of the printing system.

The method ends in an end point F.

Detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The present invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A printing system comprising:
a storage unit, the storage unit comprising a print media catalog comprising a list of print media, each print medium in the list of print media having a plurality of media attribute values characterizing the print medium, and each print medium being categorized in at least one group based on at least one of the plurality of media attribute values;
a print unit, the print unit comprising a print head for ejecting marking material on a print medium of the list of print media; and
a control unit, the control unit being configured to control the printing on a print medium of the list of print media according to a plurality of optimization parameters, an optimization parameter being related to the at least one media attribute value used for categorization in a group of the at least one group,
wherein for a print medium categorized in a particular group based on a first media attribute value upon receipt of a value of a particular optimization parameter related to the first media attribute value, the received value is automatically propagated to other print media categorized in the same particular group,
wherein the particular optimization parameter is a parameter for a curl correction determined by a particular size-weight combination of the print medium, and
wherein the print medium is selectable from the print media catalog in order to be added to the particular group upon creation or change of the particular group.

2. The printing system according to claim 1, further comprising a user interface configured to receive a selection of a print medium from the list of print media for a group of the at least one group when changing said group.

3. The printing system according to claim 2, wherein the control unit is configured to predetermine a group of the at least one group at set up of the printing system and to enable a creation of a group of the at least one group by the operator by means of the user interface.

4. A method for sharing values of optimization parameters for control of printing in a printing system, the printing system comprising a storage unit, the storage unit comprising a print media catalog comprising a list of print media, each print medium in the list of print media having a plurality of media attribute values characterizing the print medium, and each print medium being categorized in at least one group based on at least one media attribute value; a print unit, the print unit comprising a print head for ejecting marking material on a print medium of the list of print media; and a control unit, the control unit being configured to control the printing on a print medium of the list of print media according to a plurality of optimization parameters, an optimization parameter being related to the at least one media attribute value used for categorization in a group of the at least one group, wherein the method comprises the steps of:

receiving a value of a particular optimization parameter for a print medium categorized in a particular group of the at least one group;

automatically propagating the received value to other print media categorized in the same particular group;

selecting a print medium from the media catalog; and adding the selected print medium to a group of the at least one group when creating or changing the group, wherein the particular optimization parameter is a parameter for a curl correction determined by a size-weight combination of the print medium.

5. The method according to claim 4, further comprising the steps of: creating or changing the group; and simultaneously showing applicable optimizations for the group, the applicable optimizations being related to the optimization parameters for the printing system.

6. The method according to claim 4, wherein the method is executed on a processor comprised in the printing system.

7. A computer-program product embodied on a non-transitory computer readable medium and configured to execute the method according to claim 4 when executed on a processor.

8. A non-transitory data carrier having stored thereon the computer-program product according to claim 7.

* * * * *